United States Patent [19]
Nelson

[11] Patent Number: 5,242,241
[45] Date of Patent: Sep. 7, 1993

[54] DISPLAY PANEL ACCESSORY

[75] Inventor: LeRoy O. Nelson, Minnetonka, Minn.

[73] Assignee: Media/Graphics, Inc., Minneapolis, Minn.

[21] Appl. No.: 897,757

[22] Filed: Jun. 12, 1992

[51] Int. Cl.[5] .............................................. F16B 7/00
[52] U.S. Cl. ................................. 403/396; 403/381; 403/388; 160/135
[58] Field of Search ............................ 160/135, 229.1; 403/388, 389, 387, 396, 348, 252, 381; 52/239

[56] References Cited

U.S. PATENT DOCUMENTS

| | | | |
|---|---|---|---|
| 2,915,151 | 12/1959 | Kekenak | 52/239 X |
| 3,749,432 | 7/1973 | Janssen | 403/348 X |
| 3,867,048 | 2/1975 | Endzweig . | |
| 3,889,736 | 6/1975 | Firks . | |
| 3,982,841 | 9/1976 | Endzweig | 403/348 X |
| 4,109,429 | 8/1978 | Whisson | 52/239 X |
| 4,410,292 | 10/1983 | Ruther . | |
| 4,803,531 | 5/1989 | Condit et al. | 403/348 |
| 4,821,788 | 4/1989 | Nelson . | |
| 5,155,960 | 10/1992 | Shaanan | 403/348 X |

*Primary Examiner*—David M. Purol
*Attorney, Agent, or Firm*—Burd, Bartz & Gutenkauf

[57] ABSTRACT

A display accessory for rigid connection to a display panel of the type having an elongated longitudinal undercut retaining channel along one edge and having a narrow slot entrance to the retainer channel. The accessory includes a longitudinal tubular member of circular or polygonal cross-section and at least one pair of aligned longitudinally spaced apart connectors on the tubular member. Each of the connectors comprises a lock pin extending through the wall of the tubular member and having a large retaining head within the tubular member. The opposite end of the lock pin has a locking member having opposed flat faces. The shape of the locking member corresponds to the cross-section of the retainer channel of the panel to which the accessory is to be connected and the thickness of the locking member is such that it fits within the channel slot of the display panel. The lock pin extends through and is fixed to a manually operable rotator positioned between the outer wall of the tubular member and the locking member. Rotation of the rotator permits the accessory to be connected to and rigidly secured to a display panel.

15 Claims, 3 Drawing Sheets

DISPLAY PANEL ACCESSORY

BACKGROUND OF THE INVENTION

1. Field of the Invention

This invention relates to an accessory for rigid connection to a display panel of the type having an elongated longitudinal undercut retainer channel along at least one edge, the entrance to said channel defining a narrow slot. Display panels of this type are in widespread use for the construction of multiple panel temporary displays for use at conventions, trade shows, and similar exhibitions. The accessory comprises an elongated tubular member and at least a pair of aligned longitudinally spaced apart snap-into-place connectors.

The display panel accessory according to the present invention is versatile. It may be used as horizontal or vertical decorative trim for a mutiple panel display. It may be used as a horizontal hand rail. It may be used as a connector to join adjacent panels, either in flat walls or angularly displaced panels.

2. The Prior Art

Firks U.S. Pat. No. 3,889,736 is exemplary of the type of multiple panel display with which this invention is concerned and discloses standard display panel construction in which the vertical edges of individual panels are provided with recessed retainer grooves or channels for assembly of adjacent panels. Whereas Firks is concerned with and discloses means for flexably and hingedly interconnecting adjacent panels, the present invention is concerned with rigid assembly.

Applicant's prior U.S. Pat. No. 4,821,788 discloses a locking system for rigidly joining display panels together in various configurations.

SUMMARY OF THE INVENTION

Broadly stated the present invention is directed to an accessory for rigid connection to a display panel of the type having an elongated longitudinal undercut retainer channel along at least one edge, the entrance to said channel defining a narrow slot. The accessory comprises an elongated tubular member and at least a pair of aligned longitudinally spaced apart snap-into-place connectors on the tubular member. Each of the connectors comprises a lock pin having one end extending through the wall of the tubular member and having an enlarged retaining head within the tubular member. The opposite end of the lock pin has a locking member having flat faces on opposite sides, the shape of the locking member between the flat faces corresponding to the cross section of the retainer channel of the panel to which the accessory is to be connected. The thickness of the locking member is less than the width of the channel slot of the display panel to permit easy insertion of the locking member into the channel. The lock pin is fixedly held within a manually operable rotator positioned between the outer wall of the tubular member and the locking member. Rotation of the rotator first permits alignment of the locking members for insertion into the display panel retainer channel, and then, rotation of the locking member into engagement with the channel.

BRIEF DESCRIPTION OF THE DRAWINGS

The invention is illustrated by the accompanying drawings in which corresponding parts are identified by the same numerals and in which:

FIG. 1 is a perspective view of one form of multiple panel display assembly with which the accessory of the present invention may be used;

DETAILED DESCRIPTION OF THE PREFERRED EMBODIMENT

Figure 2:
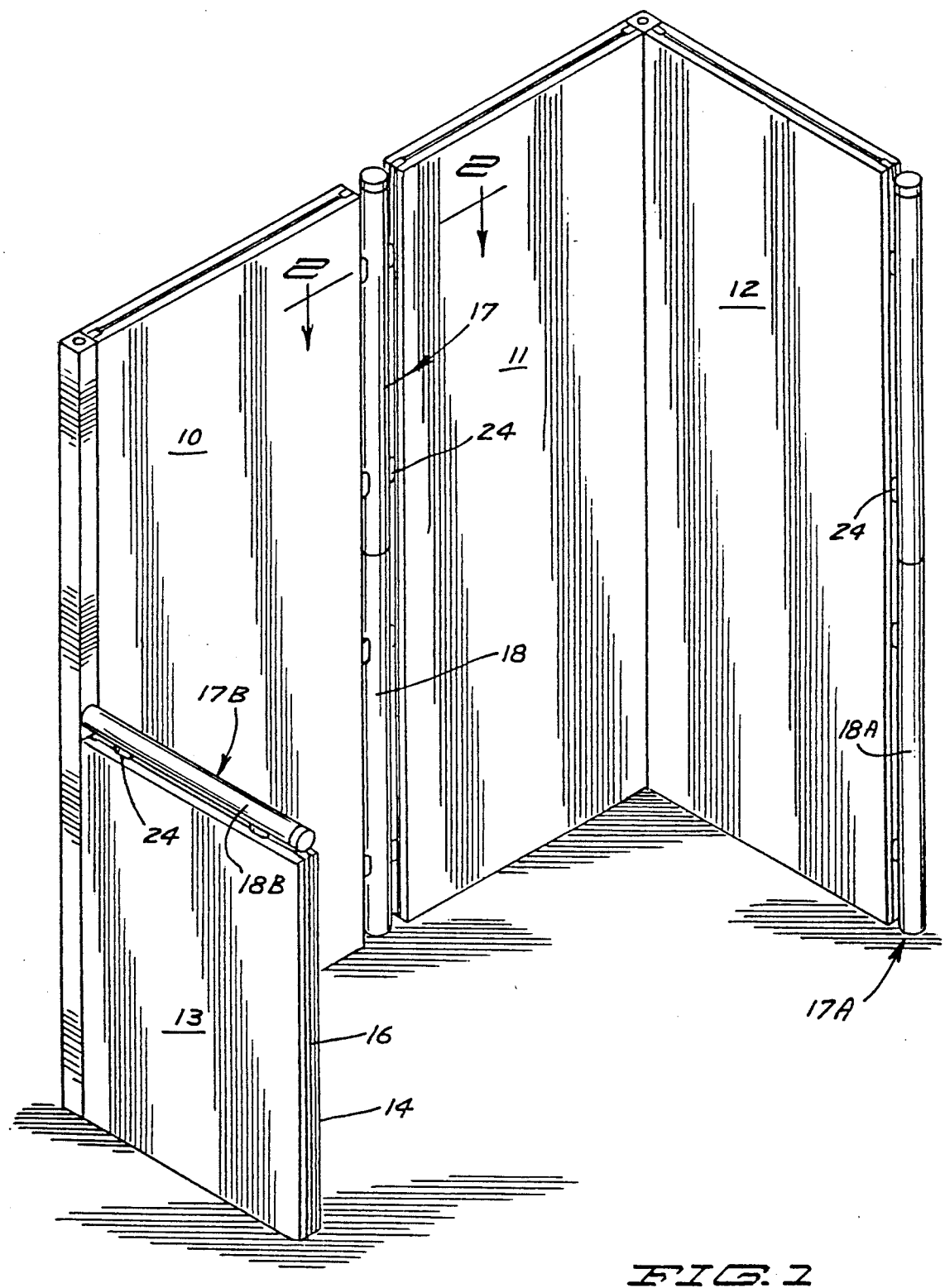
FIG. 2 is a horizontal section, on an enlarged scale, on the line 2—2 of FIG. 1 and in the direction of the arrows.
Figure 2:
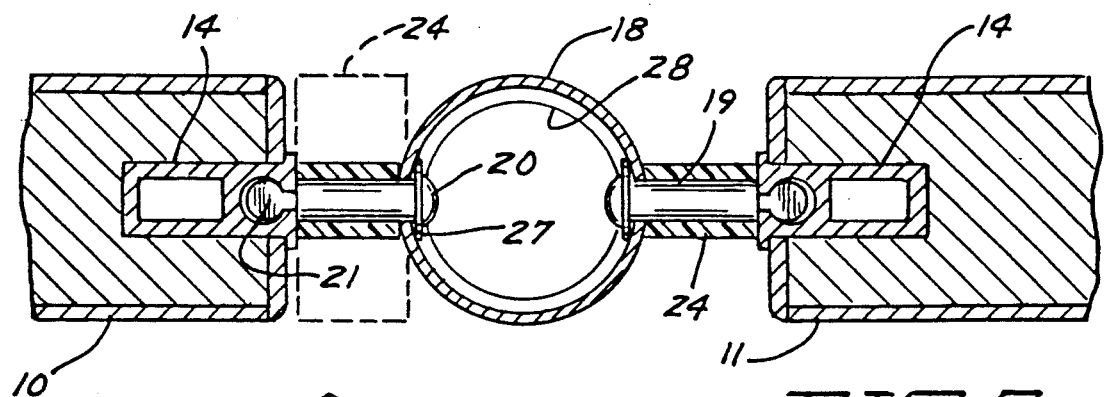

Refering now to the drawings, FIG. 1 shows in perspective view one configuration in which a plurality of display panels may be assembled into a rigid mutiple panel display utilizing the display panel accessory according to the present invention. The configuration of FIG. 1 shows a display unit having a back wall composed of two co-planar panels 10 and 11, one end wall 12 of equal height in the form of a wing-like forwardly projecting panel and another end wall 13, which is approximately one-half the height of the other panels. Numerous alternative configurations may be constructed dependent upon the available space and needs of the exhibitor.

As is well understood in the art, the display panels may be formed from any of a variety of rigid light weight structural materials, such as polystyrene foam, polyurethane foam etc., for example. Preferably for added strength and wear resistance, the opposed face surfaces of the panels are covered with a thin layer of hard, tough sheet material, such as Formica, ferrous shim stock, or the like. The panel faces may be decorative or ornamental, plain or patterned, or they may be provided with ornamental or decorative fabric or other covering.

Each display panel is enclosed within a rigid frame. Along the opposite parallel vertical edges, and preferably along all panel edges, the frame may in the form of a retainer strip 14 which includes a lontiduinally extending undercut channel 15, preferably of circular cross-section, to receive a retainer locking member as explained in greater detail hereinafter. A narrow longitudinally extending slot 16 permits access to the undercut retainer channel. The retainer strip 14 may be formed, for example, of extruded aluminum.

Three different ways in which the display accessory according to the present invention may be used are shown in FIG. 1. As indicated generally at 17, it may be used as a connector for rigidly joining panels 10 and 11. As indicated generally at 17A, it may be utilized as a decorative edge trim for end panel 12. As indicated generally at 17B, it may be utilized as a top trim or hand rail for end panel 13.

Figure 6:
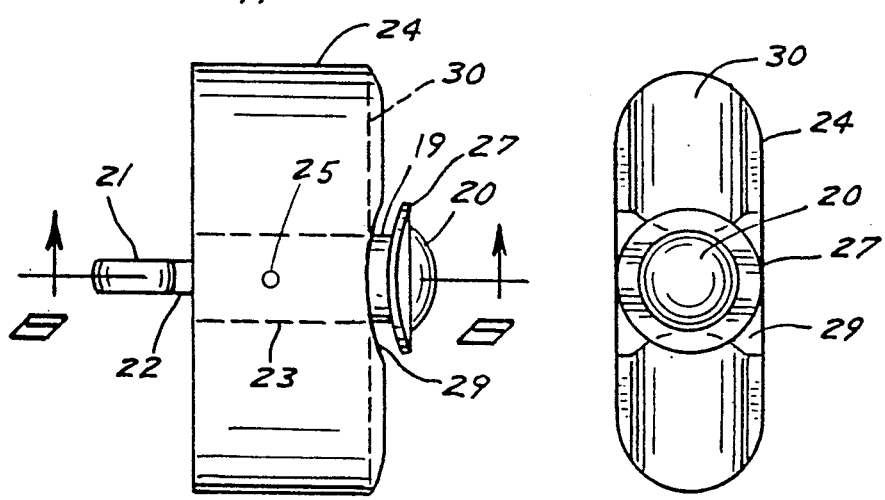
FIG. 6 is a side elevation of the connector.
Figure 7:
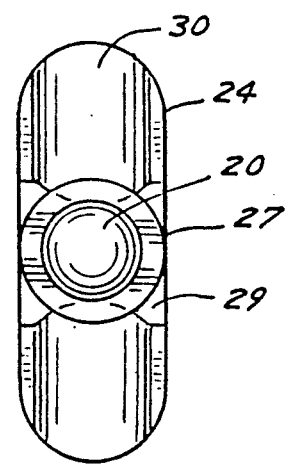
FIG. 7 is a top plan view thereof.
Figure 8:
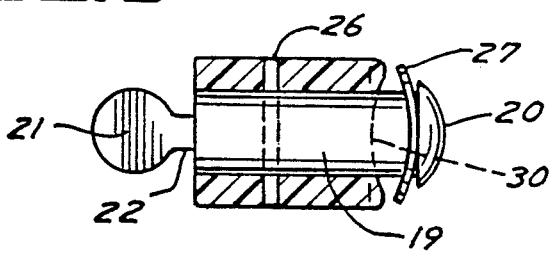
FIG. 8 is a section of the line 8—8 of FIG. 6.

The panel accessories 17, 17A and 17B are each comprised of an elongated tubular member 18, 18A, 18B etc., and at least one pair of aligned longitudinally spaced apart connectors on the outer tubular wall. The details of construction of the connectors are best shown in FIGS. 6–8. Each connector comprises a lock pin 19 which has an enlarged retainer head 20 at one end and a locking member 21 at the other end. The locking member has a pair of flat parallel spaced apart faces on opposite sides. The shape of the locking member between the flat faces corresponds to the cross-section of the retainer channel 15 of the retainer strip 14 at the edge of each panel. As shown the retainer panel is of circular cross-section and the locking member is circular, but of slightly smaller size to permit it to be rotated within the channel. The thickness of the locking member is slightly less than the width of the slot 16 of the retainer strip to permit easy entry of the locking member into the retainer channel. The head of the locking member is connected to the remainder of the lock pin by a narrow neck 22 of diameter no greater than the thickness of the locking member.

The lock pin 19 extends through a first passage 23 extending through a manually operable handle or rotator 24. Rotator 24 is a three-dimensional generally rectangular body having a top and bottom, opposite parallel sides and opposite ends. The references to "top" and "bottom" are relative since the rotator may be positioned in either horizontal or vertical configurations. In this instance "top" refers to that position as shown in FIG. 1 at 17B where the display accessory is used as a horizontal hand rail.

The lock pin 19 is fixed in rotator 24 for rotation therewith. A second passage 25 extends through the rotator body in alignment with a corresponding transverse passage through the lock pin. Passage 25 extends between the opposite sides of the rotator body and a further pin 26 extends through passage 25 and the transverse passage through the lock pin. Pin 26 is parallel to the flat faces of the locking member 21.

Figure 4:
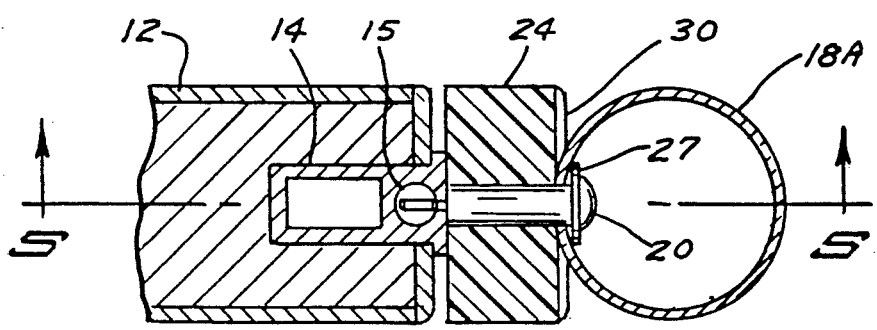
FIG. 4 is a horzontal section showing the parts of FIG. 3 in assembled but unlocked position.
Figure 5:
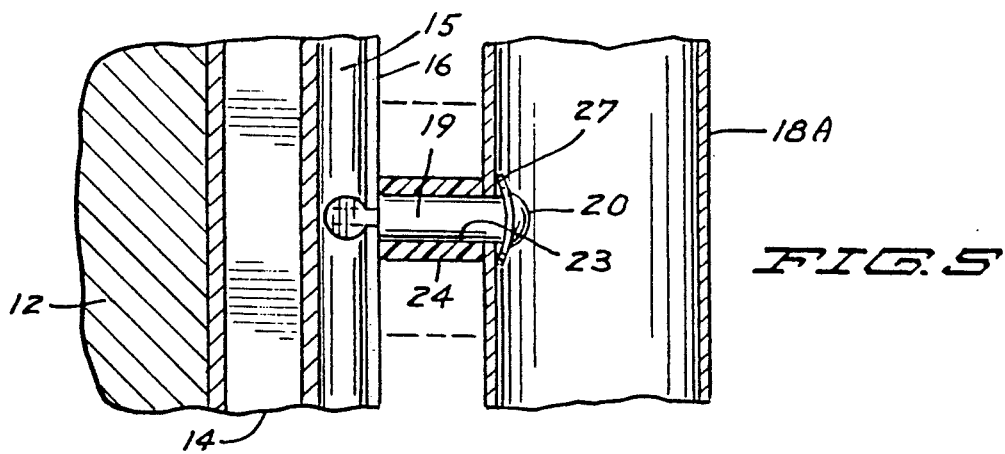
FIG. 5 is a section of the line 5—5 of FIG. 4 and in the direction of the arrows.

As best seen in FIGS. 2, 4 and 5, the connector is assembled by inserting lock pin 19 through the wall of a tubular member 18 or 18A from the inside so that retainer head 20 is on the inside of the tube. Lock pin 19 is then inserted with a close slide fit through the rotator body 24 and fixed in position by further pin 26 extending transversely through the lock pin to orient the locking member 21 to extend generally transversely of the rotator body. Preferably spring biasing means, such as a spring washer 27 is positioned around the locking pin between the retainer head and inner tubular wall before insertion of the lock pin through the wall.

For ease of assembly the connectors are spaced inwardly from the ends of the tubular members but adjacent thereto. Where tubular members of greater length are required, as shown in FIG. 1 where the accessories 17 are formed in two parts, shorter tubular members may be joined together, as by means of a closely fitting internal telescoping sleeve 28 (FIG. 2).

As best seen in FIGS. 6 through 8, a shallow transverse groove 29 is provided in the top surface of the body of rotator 24. Groove 29 intersects first passage 23 through the rotator. A similar shallow longitudinal groove 30 is likewise provided in the top surface of the rotator intersecting the first passage therethrough. Grooves 29 and 30 engage the outer walls of the tubular members 18, 18A, etc. when the rotator extends transversely relative to the tubular member for insertion of the display accessory in a panel retainer strip, and longitudinally relative to the tubular member when the display accessory is rigidly held in place. Preferably the radii of shallow grooves 29 and 30 correspond generally to the radii of the tubular members. The shallow grooves, in combination with the spring biasing provided by washer 27, provide a definite click/snap feel when the rotator is rotated manually between its functional positions.

Figure 3:
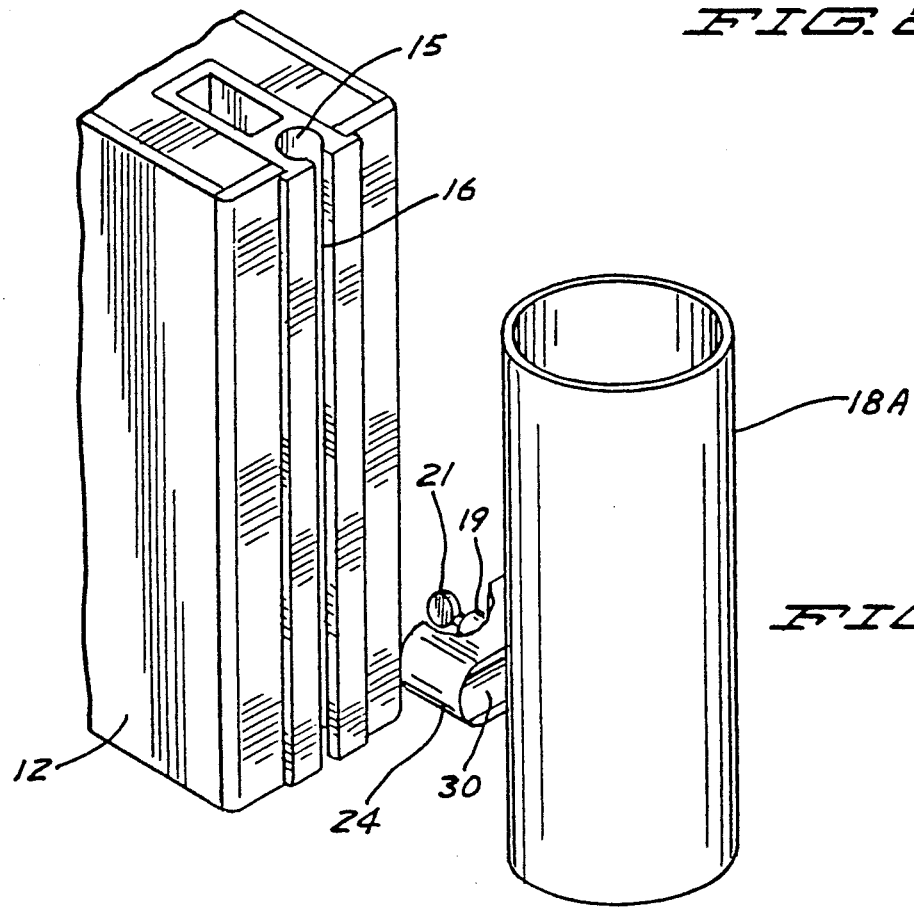
FIG. 3 is a perspective fragmentary view showing the manner in which the locking member of the accessory may be inserted into the retainer channel of a display panel.

The manner in which the display accessories 17, 17A, etc., are connected to display panels is best shown in FIGS. 3–5. In FIG. 3, a portion of the rotator 24 is broken away to better show the locking member 21 of lock pin 19. To assemble a display panel and display accessory, the rotators are turned to extend transversely relative to the tubular members to which they are attached. When this is done all of the locking members 21 are in longitudinal alignment with their flat faces lying generally in a pair of closely spaced parallel planes. While so positioned, the locking members are inserted through the slot 16 at the edge of a display panel. Then, each of the rotators is turned so as to extend longitudinally relative to the tubular members and panel edges. When this occurs, the locking members 21 are brought into locking engagement with the retainer channel 15 of the display panel, as seen in FIG. 2, to form a rigid composite assembly.

When the display accessory is used as decorative trim, as at 17A, or as a hand rail, as at 17B, the accessory connectors are in longitudinal alignment along one side only of the tubular members 18A and 18B, respectively. However, if the accessory is to be used to connect two adjacent panels lying generally in the same plane, then another set of connectors is provided extending longitudinally along the tubular member diametrically opposite from the first set of connectors. This produces a structure as shown in FIGS. 1 and 2 connecting panels 10 and 11. The connectors need not be spaced 180 degrees apart as shown in FIG. 2. Instead three sets of connectors may be provided, spaced 120 degrees apart, to form a free standing assembly of three panels, or four sets of connectors spaced 90 degrees apart may be provided to form a free standing four panel display.

Figure 9:
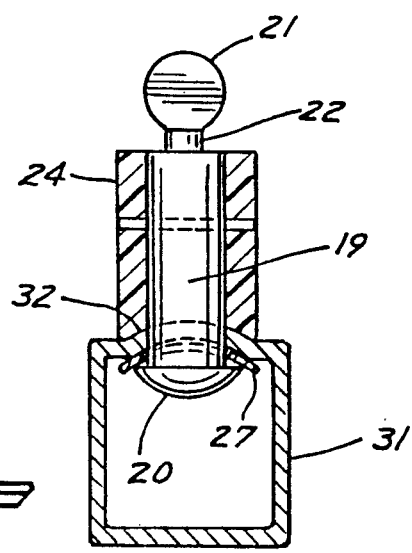
FIG. 9 is a sectional view of a display panel accessory utilizing an alternative form of tubular member.

Although the invention has been illustrated primarily with respect to tubular members of circular cross section, as shown in FIG. 9 tubular members 31 of square cross section may be provided, or the tubular member may be of other polygonal shapes having flat side walls. The tubular members may be triangular, hexagonal etc., for example, depending upon the particular display needs of the exhibitor.

Where a flat walled tubular member of polygonal cross-section is used, at least one of the flat longitudinally extending walls, in the area of the connectors, is provided with a shallow outwardly extending longitudinal convex arcuate protrusion 32. Protrusion 32 preferably has a radius corresponding generally to the radius of the shallow grooves 29 and 30 of the rotator body. The display accessories are assembled in the same manner already described for circular cross-section tubular members and the connectors snap into place with the shallow grooves in engagement with the convex protrusion in the same manner already described.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An accessory for rigid connection to a display panel having an elongated longitudinal undercut retainer channel along at least one edge, the entrance to said channel defining a narrow slot, said accessory and said panel edge when assembled being in parallel side-by-side relation, said accessory comprising:

A) an elongated tubular member, and
B) at least a pair of aligned longitudinally spaced apart connectors on one side of said tubular member spaced inwardly from the ends thereof, each of said connectors comprising:
1) a lock pin having one end extending transversely through the side wall of said tubular member,
2) an enlarged retaining head on said lock pin within the tubular member,
3) a locking member at the opposite end of said lock pin, said locking member having flat faces on opposite sides, the shape of said locking member between the flat faces corresponding to the cross section of the retainer channel of the panel to which the accessory is to be connected and being engageable therewith, the thickness of said locking member being less than the width of the channel slot of the display panel, and
4) a manually operable three dimensional rotator between the outer wall of the tubular member and said locking member, said rotator having opposite generally parallel walls and being fixed to said lock pin, whereby rotation of the rotator causes rotation of the lock pin and locking member.

2. An accessory according to claim 1 wherein spring biasing means are provided for permitting limited transverse reciprocable movement of said lock pin relative to the tubular member.

3. An accessory according to claim 2 wherein said spring biasing means is a spring washer around the lock pin between the retaining head and inner wall of the tubular member.

4. An accessory according to claim 1 wherein:
A) said rotator comprises a three-dimentional generally rectangular body having a top and bottom, opposite sides and opposite ends,
B) a first passage extends through the body from top to bottom to receive the lock pin therein with a slide fit,
C) said lock pin has a transverse passage there through intermediate between the retaining head and locking member, said passage being parallel to the flat faces of the locking member,
D) a second smaller passage extends through said body in alignment with the passage through the lock pin and extending between the sides of the body, and
E) a further pin extends through said second passage and lock pin to fix the lock pin within the body.

5. An accessory according to claim 2 wherein:
A) said rotator comprises a three-dimensional generally rectangular body having a top and bottom opposite sides and opposite ends,
B) a first passage extends through the body from top to bottom to receive the lock pin therein,
C) said tubular member is of circular cross-section,
D) said rotator has a shallow transverse groove in its top surface engageable with the outer wall of the tubular member and intersecting said first passage whereby the rotator is held snapped in position for insertion of the locking member into the retainer channel of a display panel, and E) said rotator has a shallow longitudinal groove in its top surface engageable with the outer wall of the tubular member and intersecting said first passage, whereby the rotator is held snapped in position for retaining the tubular member on the edge of the display panel.

6. An accessory according to claim 2 wherein:
A) said rotator comprises a three-dimensional generally rectangular body having a top and bottom, opposite sides and opposite ends,
B) a first passage extends through the body from top to bottom to receive the lock pin therein,
C) said tubular member is of polygonal cross-section having flat longitudinally extending walls,
D) at least one of said flat walls, in the area of the connectors, is provided with a shallow outwardly extending longitudinal convex arcuate protrusion,
E) said rotator has a shallow transverse groove in its top surface engageable with said protrusion and intersecting said first passage, whereby the rotator is held snapped in position for insertion of the locking member into the retainer channel of a display panel, and
F) said rotator has a shallow longitudinal groove in its top surface engageable with said protrusion and intersecting said first passage, whereby the rotator is held snapped in position for retaining the tubular member on the edge of a display panel.

7. An accessory according to claim 6 wherein said tubular member is of square cross-section.

8. An accessory according to claim 1 wherein at least two pairs of aligned longitudinally spaced apart connectors are provided onsaid tubular member, said pairs of connector being spaced about the periphery of the tubular member whereby adjacent display panels may be connected together.

9. An accessory for rigid connection to a display panel having an elongated longitudinal undercut retainer channel along at least one edge, the entrance to said channel defining a narrow slot, said accessory and said panel edge when assembled being in parallel side-by-side relation, said accessory comprising:
A) a rigid elongated tubular member, and
B) at least a pair of aligned longitudinally spaced apart connectors on one side of said tubular member spaced inwardly from the ends thereof, each of said connectors comprising:
1) a lock pin having one end extending transversely through the side wall of the tubular member,
2) an enlarged retaining head on said lock pin within the tubular member,
3) spring biasing means around said lock pin between said retaining head and inner side wall of the tubular member,
4) a locking member at the opposite end of said lock pin, said locking member having flat faces on opposite sides, the shape of said locking member between the flat faces corresponding to the cross-section of the retainer channel of the panel to which the accessory is to be connected and being engageable therewith, the thickness of said locking member being less than the width of the channel slot of the display panel, and
5) a rotator comprising a three-dimensional generally rectangular body having a top and bottom, opposite generally parallel side walls and opposite ends and a first passage therethrough for receiving said lock pin fixed relation to the rotator, whereby rotation of the rotator causes rotation of the lock pin.

10. An accessory according to claim 9 wherein said spring biasing means is a spring washer around the lock pin between the retaining head and inner wall of the tubular member.

11. An accessory according to claim 9 wherein:
A) said first passage in said rotator body extends from the top to bottom thereof,
B) said lock pin has a transverse passage therethrough intermediate between the retaining head and locking member, said passage being parallel to the flat faces of the locking member,
C) a second smaller passage extends through said rotator body in alignment with the passage through the lock pin and extending between the sides of the body, and
D) a further pin extens through said second passage and lock pin to fix the lock pin within the body.

12. An accessory according to claim 9 wherein:
A) said tubular member is of circular cross-section,
B) said rotator has a shallow transverse groove in its top surface engageable with the outer wall of the tubular member and intersecting said first passage, whereby the rotator is held snapped in position for insertion of the locking member into the retainer channel of a display channel, and
C) said rotator has a shallow longitudinal groove in its top surface engageable with the outer wall of the tubular member and inserting said first passage, whereby the rotator is held snapped in position for retaining the tubular member on the edge of the display panel.

13. An accessory according to claim 9 wherein:
A) said tubular member is of polygonal cross-section having flat longitudinally extending walls,
B) at least one of said flat walls, in the area of the connectors, is provided with a shallow outwardly extending longitudinal convex arcuate protrusion,
C) said rotator has a shallow tansverse groove in its top surface engageable with said protrusion and intersecting said first passage, whereby the rotator is held snapped in position for insertion of the locking member into the retainer channel of a display panel, and
D) said rotator has a shallow longitudinal groove in its top surface engageable with said protrusion and intersecting said first passage whereby the rotator is held snapped in position for retaining the tubular member on the edge of the display panel.

14. An accessory according to claim 13 wherein said tubular member is of square cross-section.

15. An accessory according to claim 9 wherein at least two pairs of aligned longitudinally spaced apart connectors are provided on said tubular member, said pairs of connectors being spaced about the periphery of the tubular member, whereby adjacent display panels may be connected together.

* * * * *